Patented Jan. 17, 1928.

1,656,681

UNITED STATES PATENT OFFICE.

JACOB SAMUEL, OF BONN, GERMANY.

METHOD OF MANUFACTURING ARTIFICIAL SAUSAGE SKINS.

No Drawing. Application filed September 21, 1925, Serial No. 57,781, and in Germany August 7, 1925.

My invention relates to the manufacture of artificial skins for sausages. The known artificial skins of this kind contain a carrier consisting of a net-work usually made from silk; which is covered by a mass, made from animal materials. They are therefore not digestible.

The chief object of my invention is to produce an artificial skin for the purpose indicated, which has no carrier, consists of the animal substances only and is therefor easily digestible.

Another object of my invention is to dispense with the comparatively costly and lengthy operations hitherto necessary in the manufacture of artificial skins for sausages, and to produce the article in a more economical manner.

Besides the stated economy of manufacture the article produced according to my invention has the advantage that it accommodates itself satisfactorily and completely to the shrinkage of the filling, when the sausage is smoked or dried.

The invention resides in the utilization of animal waste substances of any suitable kind, particularly those, which are left as by-products from the manufacture of leather in tanneries and are usually called skin-splits or scrapings, by disintegrating the same by means of a suitable grinding or mincing machine, mixing the substances thus torn and diminuted to very fine particles with water to form a homogeneous emulsion or suspension of pasty nature and forming the latter into the shape of the artificial skin, as will be described hereinafter in detail.

In most cases an addition of 15 to 40% of water will answer the purpose to satisfaction.

For the purpose of producing the sausage skin from the thus obtained more or less pasty mass or emulsion a core in the form of the sausage is employed. I dip the core into the emulsion, so that when removed from the latter, a thin layer or film will adhere thereto, which I allow to dry by evaporation in a heated room. I have found that at a moderate temperature of 50° C. the said layer or film on the core will be perfectly dried in the course of a few hours, so as to permit of being stripped off. The tubular hollow body thus obtained is ready forthwith for use in the sausage manufacture. In some cases it will be advisable to provide low transverse ribs on the peripheral surface of the core, in order to assist the emulsion in adhering to the latter.

In a modification of the invention the leading idea is to produce a tubular formation of a length greater than required for a single sausage, which is to be cut into single portions each of sufficient length for a sausage. A continuous tube of this kind may be manufactured in the following way.

The more or less pasty emulsion is supplied by means of a funnel or the like to and through a nozzle having in its mouth a concentric core so that the ejection opening is of annular form. By employing a suitable pressure-agent, such as pressure-air, in connection with usual apparatus, devices or means for forcing the pasty emulsion through the annular orifice of the nozzle, with the agency of said pressure-air, a tubular thin-walled body of any desired length can be obtained, which when dried, may be severed into as many sections as desired to form the single artificial sausage skins. As the drying operation must begin immediately upon the formation of the tubular, thin-walled body, in order to prevent the latter from collapsing, the nozzle is to be located within or adjacent to a heated room, into which the thin-walled body or tube is ejected.

In a modified way of producing the latter moulds may be employed for shaping and supporting purposes, that is rotating cylindrical cores or tubes made of wood or metal and the like, or made of a tissue which is hardened or stiffened in the usual manner to afford a firm support, so that the pasty emulsion supplied to such a core or tube can congeal and dry thereon, as hereinbefore described, and the dried tubular formation or layer can be withdrawn therefrom in order to serve as an individual sausage-skin or to be severed into single sections for use each as a sausage-skin. Alternatively, the solid mould may be covered with a fabric or tissue, but it is to be noted that in all cases where such tissue is employed, the latter serves only the purpose of readily removing the emulsion from the core without being itself enclosed in the same, a characteristic feature of the invention residing in the fact that the article to be produced in accordance with my invention consists exclusively of animal substances as clearly set forth in the preamble to this specification.

What I claim is:—

1. The method of manufacturing artificial skins for sausages, consisting in desintegrating animal waste substances, particularly skin splits and scrapings, mixing the disintegrated mass with water to form a homogeneous emulsion forming the latter into the shape of tubular lengths and drying the latter, substantially as and for the purpose set forth.

2. The method of manufacturing artificial skins for sausages, consisting in disintegrating animal waste substances, particularly skin splits and scrapings, mixing the disintegrated mass with water to form a homogeneous emulsion, passing the latter through a nozzle having an annular orifice, to produce a continuous length of tubular shape, drying the same immediately upon exit from the nozzle, and severing the same, as required, into single sections, substantially as and for the purpose set forth.

In testimony whereof I have signed my name to this specification.

JACOB SAMUEL.